Patented Oct. 16, 1928.

1,687,785

UNITED STATES PATENT OFFICE.

JOHN PERL, OF LOS ANGELES, CALIFORNIA, ASSIGNOR TO M. M. CORY, OF SAN DIEGO, CALIFORNIA.

PROCESS FOR NEUTRALIZING CELLULOSE-BEARING MATERIAL FOR SUBSEQUENT SACCHARIFICATION.

No Drawing.   Application filed June 15, 1925. Serial No. 37,349.

My invention relates to the neutralizing or preconditioning of cellulose bearing material preparatory to surface activation for subsequent saccharification, or preparatory to saccharification by gaseous acid catalysts, where, in either case, some of the saccharified product is ultimately to be subjected to fermentation or used for food consumption. Where fermentation is to be used, the unfermentable or excess salts present in the material should be those which are the least harmful or/and retardative to fermentation of the ultimate resulting product. Also, if any of the saccharified material is ultimately to be used for food consumption the material should contain no unwholesome salts and so far as possible none which would be detrimental to subsequent processes or whose necessitated removal would be impracticable.

In order to explain the desirability of the neutralizing of cellulose bearing material preparatory to surface activation for subsequent hydrolysis or saccharification, it will be necessary for me to explain the process of activating cellulose bearing material for hydrolysis.

In the industrial hydrolysis of wood or cellulose bearing material into invert sugars, glucose, dextrose, etc., by means of acid catalysts, difficulty is experienced in controlling the yields, and the properties of end products owing to the varying speed or time of the reaction.

The natural cellulose yielding materials represent an organized structure of chemical compounds of the carbohydrate series interpenetrated with cementing substances of non-carbohydrate nature. The fiber structure, which is composed of a highly molecular cellulose complex, is called the "tracheid", while the cementing structure is the "middle lamella." During treatment with hydrolytic agents the tracheids take up electrolytes by adsorption. Owing to their colloidal structure, they begin to swell with subsequent gelatinization during the reactive period. Already during the swelling period the tracheids begin to separate from the middle lamellæ and in due time the reagents will penetrate into the inner cells of the tracheids.

The process of hydrolyzing cellulosic carbohydrates into mono- or poly-saccharides depends largely on this first colloidal adsorption of the electrolytes by the swelling of the surface membrane of the tracheid fibers. When the surface membrane is in such condition that swelling and gelatinization are sluggish or prevented, the chemical reaction is correspondingly sluggish or is stopped at the surface, resulting in the deeper cells not being reached by the reagent within a reasonable or practicable length of time.

The cellulose fibers are very susceptible to chemical influences and easily lose their colloidal nature, resulting in decreased ability for adsorbing electrolytes for a subsequent swelling period. Even seasoning, atmospheric exposure, heating, or rapid drying will change the outer surface of the tracheid into a colloidally inactive modification. This can also be described as a shrinking, setting, or hardening of the peripheral wall into a waterproof film, difficult to wet, inactive and very resistant to the adsorption of electrolytes.

Such conditions occur during the manufacture of mechanical paper pulp where the wood is ground on a stone surface. When it is desired to subject such ground wood pulp to chemical reactions like hydrolysis, the surface inactivation caused by the frictional heat during mechanical grinding will offer great obstacles for the pentration of chemical reagents and particularly such reagent catalysts as are used in hydrolysis. It is known in paper manufacturing that such mechanical wood pulp will give a lower yield of pulp fiber, when subjected to cooking with pulping reagents, than wood disintegrated by other non-heating methods. Still more pronounced is the effect of this surface inactivation when such material is subjected to hydrolysis. Such modified surface or film, which materially resists the action of electrolytes, scientific investigators pronounce to be composed of hydro-cellulose. This inactive surface layer or hydro-cellulose film is soluble in dilute alkali solutions and after washing off the alkali solvent the fiber is reverted to its original state of adsorbivity.

In the process of hydrolizing cellulose yielding material into mono- or poly-saccharides by exact and controlled reactive conditions, it is quite essential that the condition of the tracheid surface be uniform, and readily adsorptive; otherwise, rapid conversion into uniformly controlled products and yields would be an impossibility. Also, in this same connection, it might be mentioned that slow or sluggish conversion tends to reduce the ultimate amount of saccharides obtained, either due to the reagent not reaching all of the deep cells or on account of the reaction not being continued long enough or due to the fact that under these conditions the reagent is allowed to act on the outer cells so long that the reaction with them is carried farther than desired, and results in undesired or detrimental products; as, in the case of partial caramelization of the converted saccharides.

The principal reason for the above described reactivation process is to prepare or precondition the raw material to be hydrolyzed into such uniform colloidal reactivity that,—irrespective of the age, seasoning, or the presence of a small amount of moisture, or the colloidal reactivity of the disintegrated raw material,—when reactive conditions (time, temperature and concentration) during hydrolysis are uniformly controlled, a uniform yield and conversion product or uniform mixture of several conversion products will result at all times and in every case.

Under a concurrently filed application filed in the United States Patent Office June 15, 1927, Serial No. 37,350, entitled "Process for activating cellulose bearing material preparatory to hydrolysis",—I have disclosed a method of retaining the activity of surface films by means of mineral acids such as hydrochloric, nitric, sulphurous, or sulphuric acids, or organic acids, such as formic, acetic, etc., or their alkali salts, or pyroligneous acid free, partly or wholly neutralized or a mixture of two or more of these acids. In case the modification of the cellulose surface has advanced as far as the stage of hydrocellulose, this surface film is first dissolved in dilute alkalies and subsequently treated with activating agents as above stated.

Sometimes very small amounts (as small as a fraction of a percent) of these acid activating agents suffice to bring about the desired result, however more is generally required as it has been found that the natural bases in the cellulose bearing material take up a certain quantity of acid for their neutralization in preference to it being used for activation of the surface film, all the more indicating the use of a cheap acid. Furthermore it has been found that most of the salts formed by a neutralization of the natural wood bases by the activating agents suggested are retarders of fermentation in varying degrees and therefore the retardative effects of such resulting salts should be considered. Also it is desirable to be able to remove the above referred to activating agents by evaporation in a later step and the least fermentation retardative salts are not those of volatile acids, therefore, the volatile acids while best adjusted for activation should not be allowed to neutralize or form salts with the natural bases where these salts will remain in the material to be fermented or where expensive removal previous to fermentation would benefit the fermentation process. I have found that with all of these requirements it is advantageous to separate the neutralizing step from the activation step as by this separation of steps it is possible to use some of several kinds of reagents in succession to produce individual effects each of which serves a specific and valuable purpose.

Likewise in the hydrolizing of cellulose bearing material with acids, other than sulphuric (principal of which is hydrochloric acid and hydrochloric acid gas) the first acid added,—where the material is not previously neutralized,—forms salts with the natural wood bases which are retardative to fermentation such as, and particularly, the chlorides of these natural wood bases.

Likewise the salts formed by the neutralization of previously added hydro-cellulose dissolving alkalies with the first hydrolizing acid, other than sulphuric, added, such as hydrochloric, form salts which are retardative to fermentation.

Likewise I find unwholesome, some of the compounds resulting from the neutralization of natural bases by hydrolizing acids or/and some of the proposed activating acids.

The principal object of this invention is to prepare or precondition the raw material for saccharification of cellulose bearing material by separating the neutralization step from the activation and/or saccharification step, wherein the neutralization step may be for acidifying one or both of the natural bases of the material, or the alkali bases adsorbed in the dissolving of the inactive, penetration resisting, hydrocellulose tracheid surface, by means of an acid which will accomplish the following:

(1) The salts so formed will have comparatively small retardative effect, if any, on subsequent fermentation;

(2) Be cheaply and practicably obtainable;

(3) The salts so formed will not be detrimental in the subsequently saccharified, and possibly further processed, product when used for food consumption and if detrimental, their removal would be practicable.

I have found that the reagent that will best satisfy all of these neutralizing requirements is sulphuric acid. It is cheap. The salts so formed are less retardative to subsequent fermentation than any other of the proposed activating acids, or acids, other than sulphuric, commonly used for the hydrolysis of cellulose bearing material. It is generally conceded that the salts resulting from its use as a neutralizing agent are not detrimental where the subsequently hydrolized or saccharified material is to be used for food consumption.

My process, therefore, is as follows: Mechanically ground wood fiber is first agitated with a warm solution of caustic alkali of 3% to 5% strength for the reverting of the inactive hydro-cellulose film, the strength of the solution depending upon the kind and condition of the material. After washing out the excess alkali, the mass is mixed with such amounts of sulphuric acid in dilute form that will neutralize the adsorbed alkali as well as the natural bases contained in the natural wood structure, and the material subjected to the action of activating agents as hereinbefore indicated. The natural bases of the wood requires from 0.1% to 0.25% of sulphuric acid for their neutralization, the amount varying with different species of wood.

To determine the amount of acid required for neutralization of natural bases in wood, the wood is ashed and the alkalinity of the ash determined and from this the quantity of acid required. The material thus reconditioned is ready for hydrolysis or saccharification and will produce high yields of uniform and controlled properties of end products. These products subjected to fermentation will show a virile growth or increase of the fermentation organisms thanks to the absence of toxic organic or inorganic salts.

Though I have described a certain process and modifications, I do not wish to be limited to the processes set forth nor to the modifications nor to complete neutralization but desire to include in the scope of my invention the processes substantially as set forth in the appended claims including partial neutralization.

Having now described my invention, what I claim as new and desire to secure by Letters Patent, is:

1. The herein described process of pretreatment of cellulose bearing material before saccharification by hydrolysis consisting in neutralizing the natural bases in said material with sulphuric acid.

2. The herein described process of pretreatment of cellulose bearing material before saccharification by hydrolysis consisting in washing said material with dilute alkali solutions and subsequently washing said material with dilute sulphuric acid for neutralization of the adsorbed alkali and the natural mineral bases in said material.

In testimony whereof, I have hereunto set my hand at Los Angeles, California, this 8th day of June, 1925.

JOHN PERL.